United States Patent
Gubin et al.

(10) Patent No.: US 9,251,141 B1
(45) Date of Patent: Feb. 2, 2016

(54) ENTITY IDENTIFICATION MODEL TRAINING

(71) Applicant: Google Inc., Mountain View, CA (US)

(72) Inventors: Maxim Gubin, Walnut Creek, CA (US);
Sangsoo Sung, Palo Alto, CA (US);
Krishna Bharat, Palo Alto, CA (US);
Kenneth W. Dauber, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 31 days.

(21) Appl. No.: 14/275,471

(22) Filed: May 12, 2014

(51) Int. Cl.
*G06F 17/27* (2006.01)
*G06F 17/28* (2006.01)

(52) U.S. Cl.
CPC ..................................... *G06F 17/28* (2013.01)

(58) Field of Classification Search
CPC ............ G06F 17/273; G06F 17/30864; G06F 17/276; G06F 17/30247; G06F 17/3079; G06F 17/277; G06F 17/3064; G06F 17/30707; G06F 17/30867; G06F 17/21; G06F 17/274; G06F 17/275; G06F 17/278; G06F 17/2785; G06F 17/28; G06F 17/30401; G06F 3/0237; G06Q 10/10; G06Q 30/018; Y10S 707/99935; Y10S 707/99933; Y10S 707/99934; Y10S 707/99936
USPC .............. 704/3, 9–10; 707/999.003–999.006, 707/765–769, 759
See application file for complete search history.

(56) References Cited

U.S. PATENT DOCUMENTS

| 5,469,538 | A | 11/1995 | Razdow |
| 5,557,723 | A | 9/1996 | Holt |

(Continued)

FOREIGN PATENT DOCUMENTS

| CA | 2711081 A1 | 1/2011 |
| EP | 843266 A3 | 1/2000 |

(Continued)

OTHER PUBLICATIONS

"Lemma What? A Guide to Text Processing and Machine Learning API Terms" [online] [retrieved Apr. 7, 2014]. http://blog.mashape.com/post/5065582409/lemma-what-a-guide-to-text-processing-and-machine, 5 pages.

(Continued)

*Primary Examiner* — Marivelisse Santiago Cordero
*Assistant Examiner* — Stephen M Brinich
(74) *Attorney, Agent, or Firm* — Fish & Richardson P.C.

(57) ABSTRACT

Methods, systems, and apparatus, including computer programs encoded on a computer storage medium, for training an entity identification model. In one aspect, a method includes obtaining a plurality of complete sentences that each include entity text that references a first entity; for each complete sentence in the plurality of complete sentences: providing a first portion of the complete sentence as input to an entity identification model that determines a predicted entity for the first portion of the complete sentence, the first portion being less than all of the complete sentence; comparing the predicted entity to the first entity; and updating the entity identification model based on the comparison of the predicted entity to the first entity.

7 Claims, 5 Drawing Sheets

(56) References Cited

U.S. PATENT DOCUMENTS

| | | | |
|---|---|---|---|
| 5,754,737 | A | 5/1998 | Gipson |
| 6,256,633 | B1 | 7/2001 | Dharap |
| 6,564,213 | B1 | 5/2003 | Ortega |
| 6,823,307 | B1 * | 11/2004 | Steinbiss et al. ............... 704/252 |
| 6,918,086 | B2 | 7/2005 | Rogson |
| 7,113,950 | B2 | 9/2006 | Brill |
| 7,249,123 | B2 | 7/2007 | Elder |
| 7,451,397 | B2 | 11/2008 | Weber |
| 7,487,456 | B2 | 2/2009 | Brooke |
| 7,630,980 | B2 | 12/2009 | Parikh |
| 7,660,806 | B2 | 2/2010 | Brill |
| 7,672,833 | B2 | 3/2010 | Blume |
| 7,751,533 | B2 | 7/2010 | Makelae |
| 7,752,148 | B2 | 7/2010 | Yu |
| 7,805,492 | B1 | 9/2010 | Thatcher |
| 7,930,302 | B2 | 4/2011 | Bandaru |
| 7,984,035 | B2 | 7/2011 | Levin |
| 7,996,419 | B2 | 8/2011 | Pfleger |
| 8,073,877 | B2 | 12/2011 | Irmak |
| 8,185,448 | B1 | 5/2012 | Myslinski |
| 8,321,410 | B1 | 11/2012 | Bharat |
| 8,386,241 | B2 | 2/2013 | Goud |
| 8,386,926 | B1 | 2/2013 | Matsuoka |
| 8,423,424 | B2 | 4/2013 | Myslinski |
| 8,429,099 | B1 | 4/2013 | Perkowitz |
| 8,441,377 | B2 | 5/2013 | Liu |
| 8,452,799 | B2 | 5/2013 | Zhou |
| 8,458,046 | B2 | 6/2013 | Myslinski |
| 8,510,173 | B2 | 8/2013 | Myslinski |
| 8,521,764 | B2 | 8/2013 | Pfleger |
| 8,594,996 | B2 | 11/2013 | Liang |
| 2002/0156816 | A1 | 10/2002 | Kantrowitz |
| 2006/0235873 | A1 | 10/2006 | Thomas |
| 2007/0174255 | A1 | 7/2007 | Sravanapudi |
| 2008/0126075 | A1 | 5/2008 | Thorn |
| 2009/0083028 | A1 | 3/2009 | Davtchev |
| 2009/0099901 | A1 | 4/2009 | Sah |
| 2009/0313017 | A1 * | 12/2009 | Nakazawa et al. ............ 704/244 |
| 2010/0286979 | A1 | 11/2010 | Zangvil |
| 2010/0293195 | A1 * | 11/2010 | Houghton ............. G06F 17/241 707/776 |
| 2012/0239381 | A1 | 9/2012 | Heidasch |
| 2013/0031106 | A1 | 1/2013 | Schechter |
| 2013/0060560 | A1 | 3/2013 | Mahkovec |
| 2013/0151240 | A1 | 6/2013 | Myslinski |
| 2013/0173604 | A1 | 7/2013 | Li |
| 2013/0198163 | A1 | 8/2013 | Slezak |
| 2013/0212111 | A1 | 8/2013 | Chashchin |
| 2013/0226935 | A1 | 8/2013 | Bai |
| 2013/0332822 | A1 | 12/2013 | Willmore |
| 2014/0019138 | A1 * | 1/2014 | Stephens, Jr. ................. 704/260 |

FOREIGN PATENT DOCUMENTS

| | | |
|---|---|---|
| EP | 1887451 A2 | 2/2008 |
| EP | 2053526 A1 | 4/2009 |
| EP | 2280332 A1 | 2/2011 |
| EP | 2639673 A1 | 9/2013 |
| WO | WO2004092979 A3 | 10/2005 |
| WO | WO2008120042 A1 | 10/2008 |

OTHER PUBLICATIONS

Lewis, David D. et al, [online] [retrieved on Apr. 7, 2014]. "A Comparison of Two Learning Algorithms for Text Categorization" http://citeseerx.ist.psu.edu/viewdoc/download?doi=10.1.1.49.860&rep=rep1&type=pdf, 14 pages.

Ruiz-Casado, et al., "From Wikipedia to Semantic Relationships: a Semi-automated Annotation Approach" [online] [retrieved on Apr. 7, 2014]. http://citeseerx.ist.psu.edu/viewdoc/download?doi=10.1.1.84.899&rep=rep1&type=pdf, 14 pages.

Tran et al., "Automatic Detection of Outdated Information in Wikipedia Infoboxes," [online] [retrieved on Apr. 7, 2014]. Retrieved from: http://pics.cicling.org/2013/rcs/Automatic%20Detection%20of%20Outdated%20Information%20in%20Wikipedia%20Infoboxes.pdf, 12 pages.

Office,"Insert and format field codes in Word 2007," [online] [retrieved on Apr. 7, 2014]. Retrieved from: http://office.microsoft.com/en-us/word-help/insert-and-format-field-codes-in-word-2007-HA010338798.aspx?CTT=5&origin=HA010100426#BM5, 5 pages.

Microsoft Support, "The FILENAME field does not automatically update when you open a document in Word" [online] [retrieved on Apr. 7, 2014]. Retrieved from: http://support.microsoft.com/kb/832897, 2 pages.

dunxd.com "Word 2010 Template with Auto-updating fields," [online] [retrieved on Apr. 7, 2014]. Retrieved from: http://dunxd.com/2012/08/08/word-2010-template-with-auto-updating-fields/, 2 pages.

* cited by examiner

ENTITY IDENTIFICATION MODEL TRAINING

BACKGROUND

This specification relates to training an entity identification model.

Entity identification is the process of identifying particular entities, e.g., persons, places, and things, referred to by text. Entities may be identified manually, e.g., by a user annotating text, and the identifications be used, for example, to improve reading comprehension and classification of documents.

SUMMARY

This specification describes technologies relating to entity identification.

In general, one innovative aspect of the subject matter described in this specification can be embodied in methods that include the actions of obtaining a plurality of complete sentences that each include entity text that references a first entity; for each complete sentence in the plurality of complete sentences: providing a first portion of the complete sentence as input to an entity identification model that determines a predicted entity for the first portion of the complete sentence, the first portion being less than all of the complete sentence; comparing the predicted entity to the first entity; and updating the entity identification model based on the comparison of the predicted entity to the first entity. Other embodiments of this aspect include corresponding systems, apparatus, and computer programs, configured to perform the actions of the methods, encoded on computer storage devices.

These and other embodiments can each optionally include one or more of the following features. The method may further include, for each sentence for which the predicted entity does not match the first entity: providing a second portion of the complete sentence as input to the entity identification model that determines a second predicted entity for the second portion of the complete sentence, the second portion being different from the first portion and being less than all of the complete sentence; comparing the second predicted entity to the first entity; and updating the entity identification model based on the comparison of the second predicted entity to the first entity.

Updating the entity identification model based on the comparison of the predicted entity to the first entity may include reducing a prediction confidence score for the predicted entity when the first portion of the complete sentence is provided as input to the entity identification model.

Updating the entity identification model based on the comparison of the second predicted entity to the first entity may include increasing a prediction confidence score for the second predicted entity when the second portion of the complete sentence is provided as input to the entity identification model.

The method may further include determining, for each of the plurality of complete sentences, that the entity text included in the complete sentence references the first entity based on the inclusion of the first entity in the complete sentence.

The first portion of the complete sentence may include a portion of the entity text. The entity identification model may determine one or more predicted entities for the portion of the entity text included in the first portion of the complete sentence and, for each of the one or more predicted entities, a prediction confidence score that indicates a likelihood that the predicted entity matches the first entity.

In general, another aspect of the subject matter described in this specification can be embodied in methods that include the actions of obtaining an incomplete sentence that includes entity text; providing at least a portion of the incomplete sentence as input to an entity identification model that has been trained to predict a particular entity referred to by the entity text included in the incomplete sentence based on a predicted entity being referred to by a complete sentence that matches the portion of the incomplete sentence; and receiving, from the entity identification model, a prediction that the entity text included in the incomplete sentence refers to the predicted entity. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Training an entity identification model using sentences that include entity text referencing known entities may lead to a more robust entity identification model. The ability to predict entities from incomplete sentences allows other systems, such as textual suggestion systems, to better provide information relevant to the predicted entities. Having robust confidence scores for entity predictions for multiple sentences and multiple portions of each sentence may improve entity predictions as sentences are typed. This may improve user experience by, for example, increasing the likelihood that entities will be properly identified and, in the context of user suggestions, increasing the likelihood that the user will be presented with relevant suggestions. In addition, having an entity identification model capable of providing output indicating that more input is needed may help prevent erroneous entity identifications, further improving the user experience.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An entity identification system can, using complete sentences with known entities, be trained to use partial sentences to predict an entity referred to by text included in the partial sentences. For example, when a user enters "The President of the Un" as input to a document editing application that uses an entity identification system, the entity identification system may use input to predict the entity to which the partial text refers, e.g., a current or former president of the United States, the United Arab Emirates, or a University.

The entity identification system obtains complete sentences that each include entity text that references a first entity. An example complete sentence may be, "In 1890, the President of the United States was Benjamin Harrison." In the context of this example sentence, the entity text, "President of the United States" references the person, "Benjamin Harrison." For each complete sentence, the entity identification system emulates typing the sentence and providing portions of the sentence to an entity identification model. The entity identification model determines a predicted entity for each portion of a sentence that it receives as input.

For example, the entity identification model may receive "In 1890, the P" as input. The 'P' could refer to almost anything in 1890, e.g., "popular paintings," "Puerto Rico census," "printing press," or "President of the United States." Using that portion of the sentence as input, the entity identification model determines a predicted entity for that portion of the sentence. The predicted entity may be, for example, the printing press. After comparing the predicted entity, the printing press, to the known entity, Benjamin Harrison, the entity identification system updates the entity identification model. For example, the entity identification model may be updated to decrease the likelihood that "printing press" would be identified as the entity for the input, "In 1890, the P."

The entity identification system may continue to input portions of the complete sentence, updating the entity identification model for each portion based on the accuracy of the prediction. For example, the entity identification model may receive, "In 1890, the President of the Un," as input. While this input may still refer to multiple entities, e.g., Benjamin Harrison, the President of the United States in 1890, or William Ellison Boggs, the President of the University of Georgia in 1890, the entity identification model may correctly predict Benjamin Harrison for this portion of the complete sentence. In this situation, the entity identification model may be updated, for example, by increasing a confidence and/or likelihood that Benjamin Harrison will be identified for a sentence that begins "In 1890, the President of the Un."

An entity identification model may be trained using the foregoing method on many complete sentences for many entities. When trained, the entity identification model may be used to predict entities for incomplete sentences and have a relatively robust confidence, or robust lack of confidence, in each prediction. The model may be used, for example, in a suggestion system, to offer suggestions to users based on an identified entity.

These features and addition features are described in more detail below.

Figure 1:
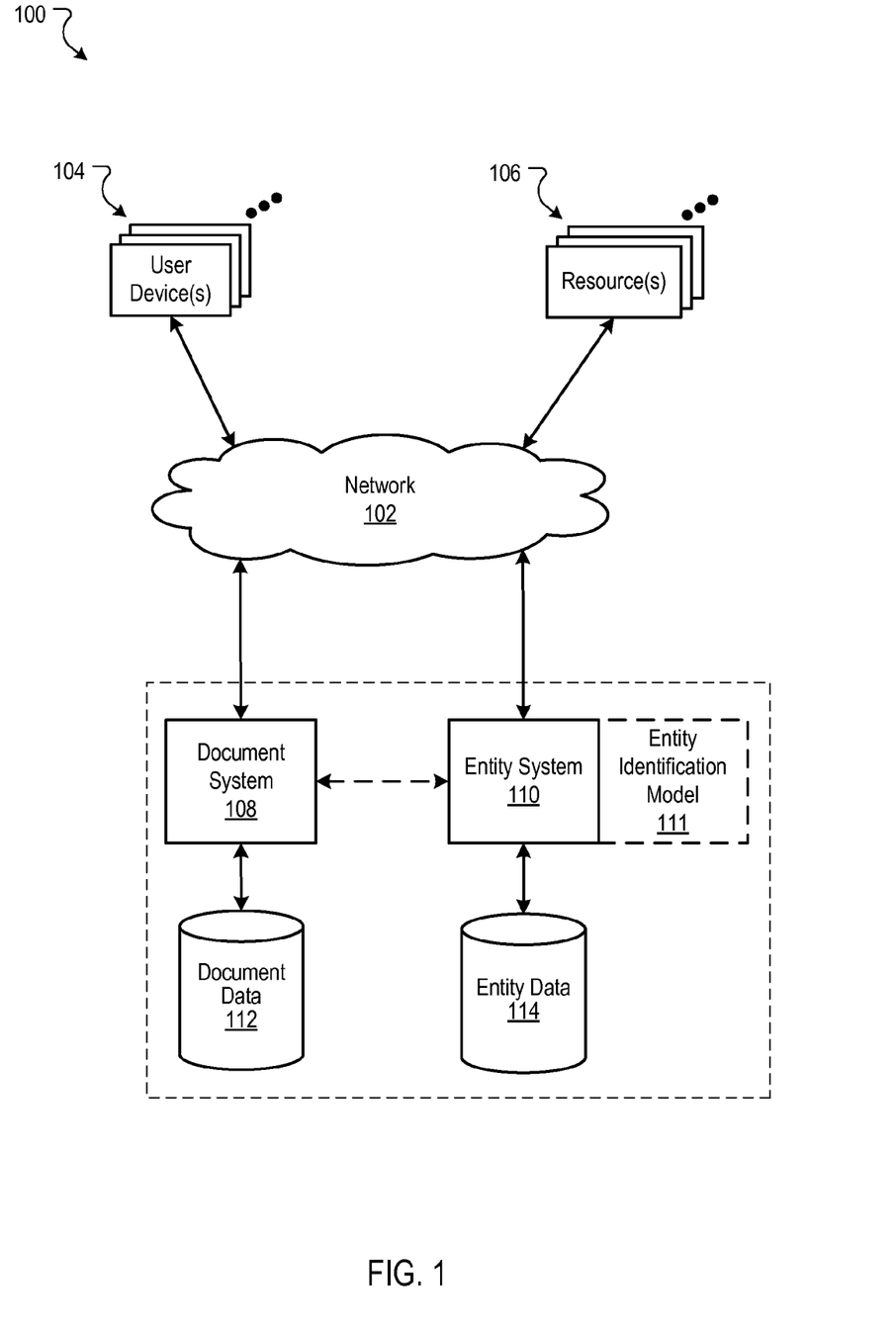
FIG. 1 is a block diagram of an example environment in which an entity identification model is trained.

FIG. 1 is a block diagram of an example environment 100 in which an entity identification model is trained. A computer network 102, such as a local area network (LAN), wide area network (WAN), the Internet, or a combination thereof, connects user devices 104 and resources 106 to a document system 108 and entity identification system 110. The online environment 100 may include any number of user devices 104 and resources 106. In some implementations, connections between user devices 104 and the document system 108 may be local, e.g., the document system 108 may be part of or directly connected to a user device rather than connected across the network 102.

A user device 104 is an electronic device capable of requesting and receiving resources, such as documents and web pages, over the network 102. Example user devices 104 include personal computers, mobile communication devices, and other devices that can send and receive data over the network 102. A user device 104 typically includes a user application, such as a web browser, to facilitate the sending and receiving of data over the network 102. The web browser can enable a user to display and interact with text, images, videos, music, web applications, and other information typically located on a web page at a website.

A resource 106 is data that can be provided by a publisher over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A document system 108 communicates with one or more user devices 104 to provide the user devices 104 with access to documents, e.g., by providing a document editing application interface. For example, the document system 108 could be an e-mail server that provides an e-mail interface through which user devices 104 read and write e-mails, or a cloud word processing server that provides an interface through which user devices 104 create, modify, and share word processing documents, presentations, and spreadsheets. Example documents include a word processing document, an e-mail message, a blog post, an SMS, MMS or similar text message, or a web page, as well as text entry fields in applications and the like.

An entity identification system 110 identifies entities based on text. For example, the entity identification system 110 may receive textual input, in the form of words, phrases, sentences, etc., and identify entities referenced in the text, e.g., using a trained entity identification model 111. Textual input may originate from any number of input methods, such as hardware or software based keyboard input and/or voice input that is transcribed to text by a user device or a separate transcription service/device. In some implementations, entities are topics of discourse. In some implementations, entities are concepts or things that can be referred to by a text fragment, e.g., a term or phrase, and are distinguishable from one another, e.g., based on context. Entities, and relationships between them, may be used by the topic system 110 to identify entities in text. In some implementations entities have an identifier that ensures entities are unique. In situations where text may be ambiguous, e.g., time sensitive titles such as the CEO of a company or President of a country, or people who share the same name, the actual entity referenced —if known—is unique, e.g., there may be multiple individuals named "George Washington," but only one of them was the first President of the United States, so multiple entities named "George Washington" may exist, but with separate and unique identifiers differentiating them.

By way of example, the Empire State Building is an entity, e.g., a building in New York City. The year 1931 is also an entity. These distinct entities may be related to one another, e.g., constructed completed on the Empire State Building in 1931. The year 1931 may also be related to many other entities, e.g., the song, "Star-Spangled Banner" became the second national anthem of the United States. The Empire State Building may also be related to many other entities, e.g., any number of Hollywood films featuring the building may each be entities, and one relationship between any one of them is the featuring of the building in the film, e.g., the 1933 movie, "King Kong." The manner in text referring to entities and how the relationships between entities are used to identify entities is described in further detail below.

Document data 112 is used to store data used by the document system 112 and may include, for example, document files, user data, and performance measures. The entity data 114 is used to store data used by the entity identification system 110. Example entity data 114 may be, for example, a graph in which entities are represented as nodes and relations between entities are represented by edges. Furthermore, the relations may also be attributes that relate the entities. The entity data 114 may also include other data, such as facts related to each entity, and need not necessarily be in the form of a graph structure. Other information may also be stored in the document data 112 and/or the entity data 114. While the storage devices are depicted separately in the example environment 100, in some implementations some or all of the document data 112 and topic data 114 may be combined or stored separately in other data storage devices.

Similarly, while the document system 108 and entity identification system 110 are depicted separately from one another, in some implementations they may be part of the same system. For example, the entity identification system 110 could be a component of the document system 108. In some implementations, the document system 108 or a portion thereof, such as a document editing application, may be included on a user device. For example, a document editing application running locally on a user device may communicate with a document system 108 and/or entity identification system 110 through the network 102.

Figure 2:
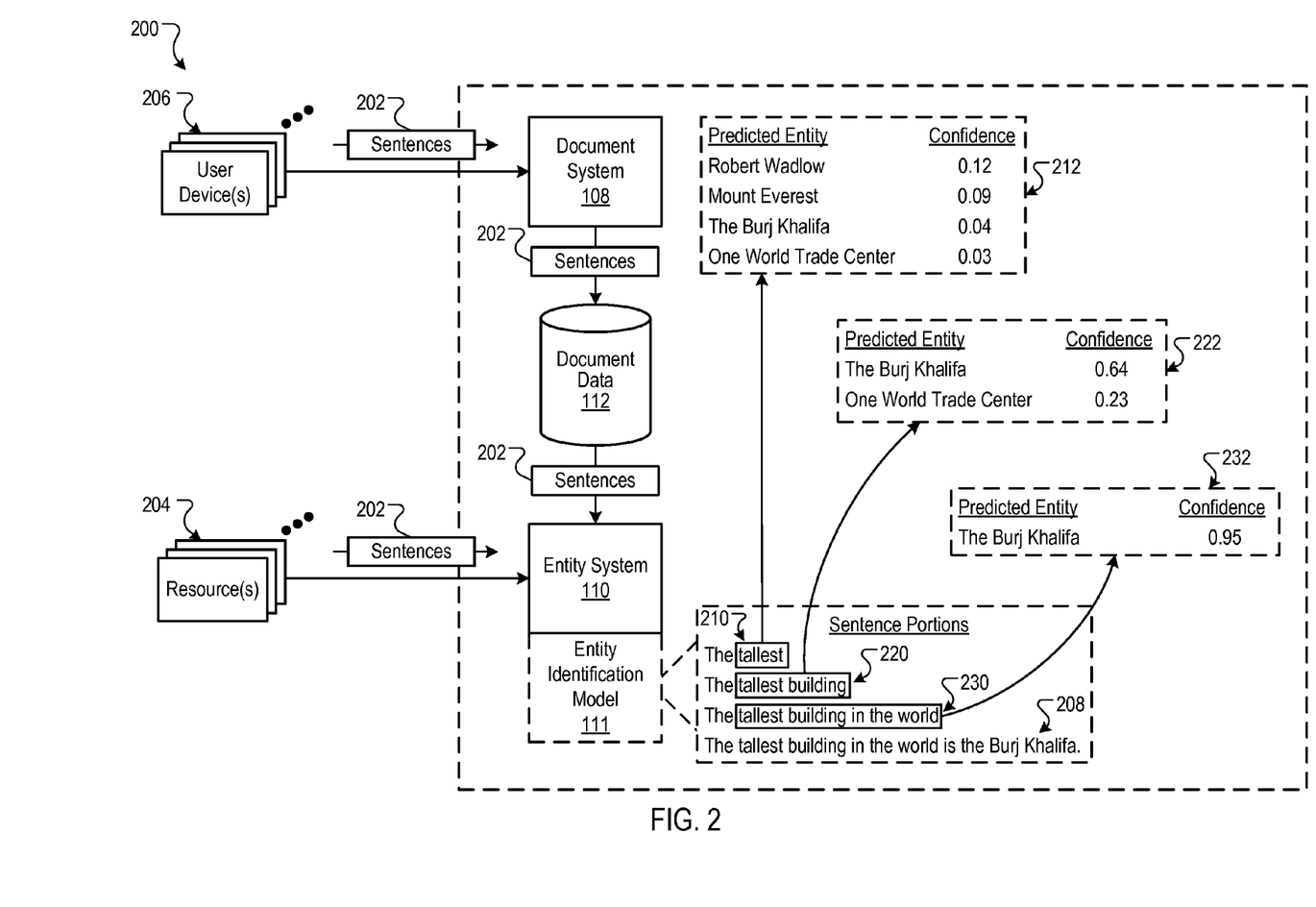
FIG. 2 is an illustration of an example process for training an entity identification model.

FIG. 2 is an illustration of an example process 200 for training an entity identification model 111 using portions of complete sentences. The entity identification system 110 obtains complete sentences 202 from various sources. A complete sentence may be, for example, grammatical text that expresses an independent statement and typically includes a subject and predicate. The complete sentences 202 obtained by the entity identification system 110 each include entity text that references an entity. For example, the complete sentence 208, "The tallest building in the world is the Burj Khalifa," includes entity text, e.g., "the tallest building in the world," which references the entity "Burj Khalifa." In some implementations, each complete sentence has been identified as a complete sentence including entity text referencing an entity based on the inclusion of the entity in the complete sentence. For example, the entity identification system 110 knows that "Burj Khalifa" is the entity referenced by the entity text, "the tallest building in the world," based on the inclusion of "Burj Khalifa" in the sentence. Entity text may refer to any text that references an entity, e.g., "the tallest building" or "the tallest building in the world" may both be considered entity text.

In some implementations, the entity referenced by the complete sentence 208 need not be included in the sentence. For example, the complete sentence, "In 1931, the tallest building in the world was 1,454 feet tall." In this example, due to the qualifying text, "In 1931," the entity text, "the tallest building in the world," references the Empire State Building. The entities, relationships, and entity text of the sentences 202 obtained by the entity identification system 110 may, in some implementations, have been previously identified, e.g., using an entity identification model, manual marking, and/or other entity identification systems or methods.

The source(s) of complete sentences 202 provided to the entity identification system 110 may vary. In the example process 200, the entity identification system 110 obtains complete sentences 202 from resources 204, such as web pages, as well as from document data 112. The document data 112 may include, for example, sentences 202 included in word processing documents drafted by user devices 206. Other sources may also be used to obtain complete sentences, alone or in addition to the resources 204 and document data 112, such text from audio transcriptions and images processed using optical character recognition techniques.

The entity identification system 110 provides a first portion 210 of the complete sentence 208 as input to an entity identification model 111 that determines a predicted entity for the first portion 210 of the complete sentence 208. The first portion 210 of the complete sentence 208 is less than the entire complete sentence 208. In some implementations, the sentence portions provided to the entity identification model 111 need not include all words and/or characters of the entity text. E.g., in the example process, the first portion 210 reads, "The tallest," which does not include all of the entity text, "tallest building in the world." A first set of predicted entities 212 provided by the entity identification model 111 includes potential entities referenced by the text, "The tallest." For example, Robert Wadlow was the tallest person in human history, Mount Everest is the tallest mountain in the world, The Burj Khalifa is the tallest building in the world, and One World Trade Center is the tallest building in the United States.

In some implementations, the entity identification model 111 also provides a confidence score for each predicted entity. For example, a confidence score for the entity "Robert Wadlow" may be based on how often sentences beginning with "The tallest" turned out to reference Robert Wadlow. If "Robert Wadlow" is more often the entity referred to in sentences beginning with "The tallest" than "Mount Everest," then the confidence score of "Robert Wadlow" may be higher than the confidence score for "Mount Everest." Many other methods, or combinations of methods, may be used to determine confidence scores for entities.

In the example process 200, the entity, "Robert Wadlow," is the predicted entity having the highest confidence score in the first set of predicted entities 212, and it represents the entity identification model's best guess as to which entity "The tallest" refers to. The predicted entity, e.g., "Robert Wadlow," is compared to the entity referenced by the complete sentence 208, "The Burj Khalifa," and the entity identification model 111 may be updated based on the comparison. In the example process 200, the two entities do not match. In this situation, the entity identification model 111 may be updated. For example, the confidence in predicting The Burj Khalifa as the entity referenced by the incomplete sentence, "The tallest," may be increased; the confidence in predicting Robert Wadlow, or any other entity, as the entity referenced by the incomplete sentence, "The tallest," may be decreased; and/or the entity identification model 111 may increase the likelihood of not providing a predicted entity for the incomplete sentence, "The tallest." In some implementations the entity identification model 111 may choose to provide output indicating that more information is needed to make an accurate entity prediction. Providing output indicating that more information is needed may, for example, be preferable over providing an entity that is unlikely to be correct.

In some implementations, when the predicted entity does not match the entity referenced in the complete sentence 208, the entity identification system 110 may continue training the entity identification model 111. For example, the entity identification system 110 may emulate typing a sentence, providing incrementally updating incomplete sentences to the entity identification model 111, and adjusting the entity identification model 111 based on the results. The incremental portions of a complete sentence provided may vary, for example, by one character, word, or phrase. In the example process 200, a second portion 220 of the complete sentence 208, "The tallest building," is provided to the entity identification model 111. The second set of predicted entities 222 provided by the entity identification model 111 is different from the first set of predicted entities 212, e.g., based on the addition of the word "building." In this example, the entity identification model 111 has identified two entities that may be referenced by "The tallest building," e.g., The Burj Khalifa and One World Trade Center. As with the first set of predicted entities 212, each entity in the second set 222 has a corresponding confidence score indicating a confidence that the entity is referenced by the incomplete sentence.

In the example process 200, the entity, "The Burj Khalifa," is the predicted entity having the highest confidence score in the second set of predicted entities 222, and it represents the entity identification model's best guess as to which entity "The tallest building" refers to. The entity identification system 110 compares the predicted entity to the actual entity referenced by the complete sentence. In this example, the two entities match, e.g., the entity identification model 111 correctly predicted that the entity referenced by a sentence beginning with "The tallest building" referenced The Burj Khalifa. In this situation, the entity identification model 111 may be updated to reflect an increased likelihood that the Burj Khalifa will be identified as the entity referenced by the incomplete sentence, "The tallest building."

In some implementations, even though the entity identification model 111 has correctly identified an entity, the model may still be updated to provide output indicating that more input is needed. For example, a confidence score threshold may be used to determine whether the entity identification model 111 will provide a predicted entity as output, or will provide data indicating more input is needed instead. Using an example threshold confidence score of 0.75, the example predicted entity in the second set of predicted entities 222, e.g., "The Burj Khalifa," may not be provided as a predicted entity due to its confidence score (0.64) not meeting the threshold (0.75).

In the example process 200, a third portion 230 of the complete sentence 208, "The tallest building in the world," is provided as input to the entity identification model 111. A third set of predicted entities 232 indicates that one predicted entity has been identified, The Burj Khalifa, with a confidence score of 0.95. When compared to the example confidence score threshold of 0.75, the predicted entity meets the threshold, allowing the entity identification model 111 to provide "The Burj Khalifa" as the predicted entity for a sentence beginning with "The tallest building in the world."

In some implementations, the entity identification system 110 continues training the entity identification model 111 until the entire sentence has been incrementally provided as input. In addition, the exact nature of the updates to the entity identification model 111 may vary. In some implementations the confidence scores may be adjusted based on matches, or lack thereof, between predicted entities and those actually referenced in complete sentences. Successively correct predictions on the same sentence may, in some implementations, have a reduced impact on adjustments to the model.

The entity identification system 110 trains the entity identification model 111 on many sentences, so predicted entities, confidence scores, and determinations regarding when the model needs more input may change throughout the training process. For example, a complete sentence reading, "The tallest building in the world in 1931 was the Empire State Building" may cause further changes to the entity identification model 111 when identifying an entity for the incomplete sentence, "The tallest building in the world."

In some implementations, the entity identification model 111 may use data in addition to that shown in the example process 200 to identify entities. For example, prior sentences included in documents, or a known context or topic of a document, may also be used to predict entities referred to by incomplete sentences. E.g., the text, "the tallest," in a news article about tall people may be more likely to refer to Robert Wadlow than the same text would in a research paper on the Himalayan Mountains.

Various other parameters may also be used to train the entity identification model 111, such as sentence frequency relative to other sentences, popularity of particular entities, the location of the user, the contexts the sentences, etc. Each of these features may be modeled and weighted while training the entity identification model 111. Thus, the training of the entity identification model 111 not only takes into account the entity prediction for a particular sentence, but also takes into account the multiple other features over which a machine learning process can learn the most likely entity predictions for a variety of sentence portions.

The trained entity identification model 111 may be used by the entity identification system 110 to, among other things, identify suggestions to be provided for incomplete sentences. For example, a user who has typed the incomplete sentence, "The tallest building in," may provide that incomplete sentence to a suggestion system that, in combination with the entity identification system, identifies "the world is the Burj Khalifa" as a suggested completion for the user's incomplete sentence.

While various components, such as the document system 108 and entity identification system 110, are depicted separately in the illustration of the example process 200, the components may be included in a single system, as shown by the dotted line encompassing the components, or a different combination of systems than the depicted combination. In addition, the storage devices depicted may be combined, and may also be stored, in whole or in part, separately from the system that trains the entity identification model 111.

Figure 3A:
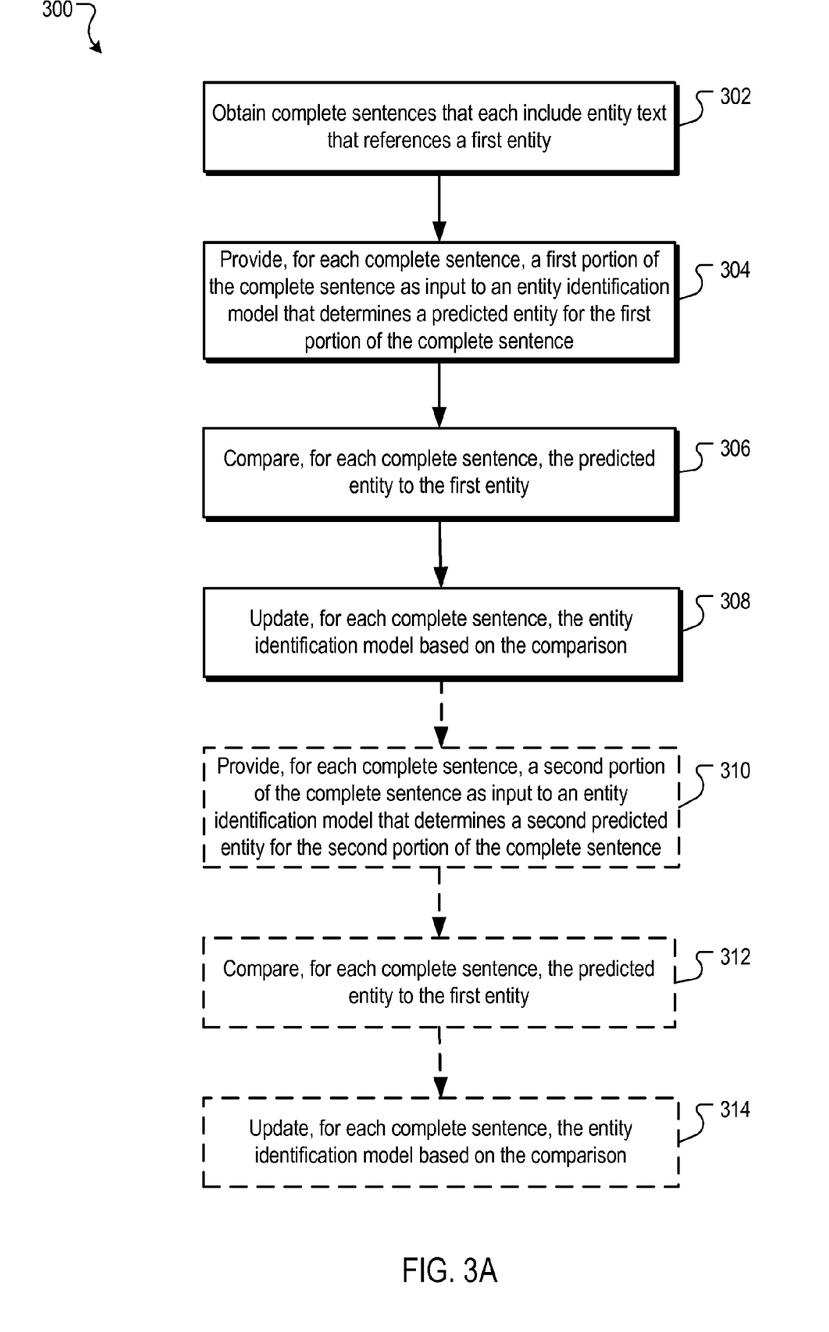
FIG. 3A is a flow diagram of an example process in which an entity identification model is trained.

FIG. 3A is a flow diagram of an example process 300 in which an entity identification model is trained. The process 300 may be performed by an entity identification system, such as the system described above with reference to FIG. 2.

Complete sentences are obtained that each include entity text referencing a first entity (302). One example complete sentence is, "In 1803, the Louisiana Purchase was authorized by the President of the United States." The example sentence may reference several entities, e.g., the Louisiana Purchase, 1803, the President of the United States, and Thomas Jefferson; and in this example, the text, "President of the United States," may be an entity and may also be entity text that refers to Thomas Jefferson. In some implementations, it is determined that the entity text included in the complete sentence references the first entity based on the inclusion of the first entity in the complete sentence. For example, the sentence, "At the time, the President of the United States was Thomas Jefferson," includes entity text, "President of the United States." It may be determined, e.g., from his inclusion in the complete sentence, that the entity text references Thomas Jefferson as opposed to another President.

For each complete sentence, a first portion of the sentence is provided as input to an entity identification model that determines a predicted entity for the first portion of the complete sentence (304). The first portion of the complete sentence is less than the entire complete sentence. For example, "At the time, the President of the U" may be provided as input to the entity identification model, which may predict that "the President of the U" refers to the entity, "the President of the University."

In some implementations, the first portion of the complete sentence includes a portion of the entity text. E.g., in the foregoing example, "At the time, the President of the U," includes a portion of the entity referenced, the President of the United States.

In some implementations, the entity identification model determines two or more predicted entities for the portion of the entity text included in the first portion of the complete sentence and, for each of the predicted entities, a prediction confidence score that indicates the likelihood that the predicted entity matches the first entity. Using the example above, the entity identification system may identify multiple entities, such as "the President of the University," "the President of the United States," and "the President of the United Arab Emirates." Each predicted entity may be associated with a score, e.g., between 0 and 1, indicating a likelihood that the corresponding entity is the entity of the complete sentence.

For each complete sentence, the predicted entity is compared to the first entity (306). For example, the predicted entity, "the President of the University," is compared to the first entity referenced in the complete sentence, "the President of the United States."

For each complete sentence, the entity identification model is updated based on the comparison (308). For example, if the predicted entity matches the first entity, the model may be updated by increasing the likelihood of the predicted entity being provided as output for input matching the first portion of the complete sentence. If, on the other hand, the predicted entity does not match the first entity, the model may be updated by decreasing the likelihood of the predicted entity being provided as output for input matching the first portion of the complete sentence. Other methods of updating the model, such as those described above with reference to FIG. 2, may also be used.

In some implementations, for each complete sentence for which the predicted entity does not match the first entity, a second portion of the complete sentence is provided as input to the entity identification model that determines a second predicted entity for the second portion of the complete sentence (310). The second portion is different from the first portion, and is less than the entire complete sentence. For example, when it is determined that "the President of the University" does not match the actual entity referenced, "the President of the United States," another portion of the sentence with additional text, e.g., "At the time, the President of the United S," may be provided to the entity identification model to determine a second predicted entity.

For each complete sentence for which the predicted entity does not match the first entity, the second predicted entity is compared to the first entity (312). For example, the second predicted entity may be "the President of the United States," which may be compared to the first entity, "the President of the United States." In this example, the second predicted entity identified by the entity identification model correctly identified "the President of the United States" as the entity referenced by the complete sentence.

For each complete sentence for which the first predicted entity does not match the first entity, the entity identification model is updated based on the comparison of the second predicted entity to the first entity (314). The model may be updated in a manner similar to that used when comparing the first predicted entity to the first entity. In implementations where confidence scores are used to predict likelihood of correctly identifying an entity, for example, confidence scores may be boosted for predicted entities that match the first entity, while confidence scores may be demoted for predicted entities that do not match the first entity.

In some implementations, portions of the process 300 may be repeated in an iterative fashion on a large number of complete sentences. Using this process 300 trains an entity identification model to identify entities based on incomplete sentences. In addition to being able to identify entities, the entity identification model may also be trained to provide data indicating that more input is needed before an entity may be predicted with a certain measure of confidence. The ability to identify entities from incomplete sentences may be useful, for example, in a suggestion system that provides autocomplete suggestions for a user, or for a fact-checking system that uses identified entities to search for and/or verify facts about those entities.

Figure 3B:
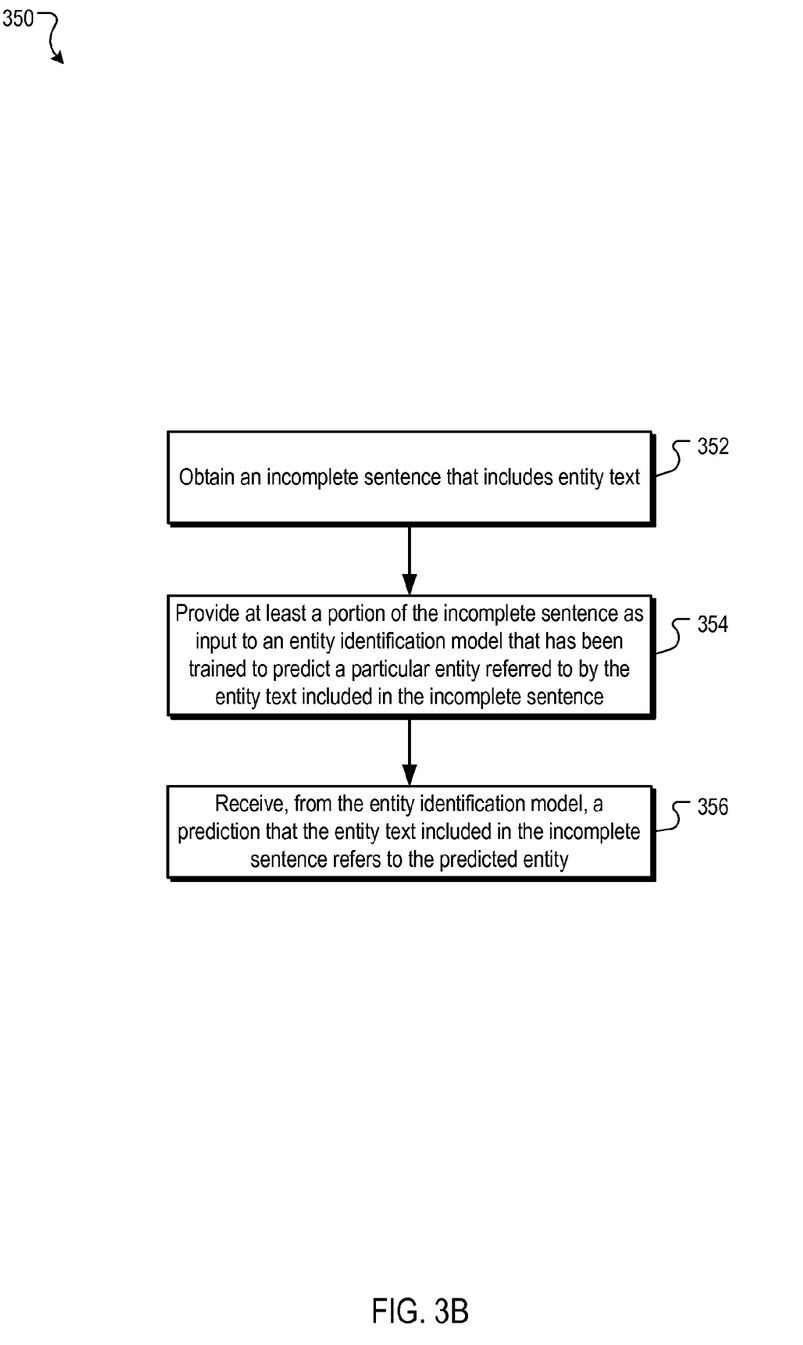
FIG. 3B is a flow diagram of an example process in which an entity identification model is used.

FIG. 3B is a flow diagram of an example process 350 in which an entity identification model is used. The process 300 may be performed by an entity identification system, such as the system described above with reference to FIG. 2.

An incomplete sentence is obtained that includes entity text (352). For example, a document system may obtain, from a user device, an incomplete sentence that begins, "The tallest building in the U."

At least a portion of the incomplete sentence is provided as input to an entity identification model that has been trained to predict a particular entity referred to by the entity text included in the incomplete sentence (354). The prediction may be based on a predicted entity being referred to by a complete sentence that matches the portion of the incomplete sentence. For example, "The tallest building in the U" may match one or more sentences used to train the entity identification model, such as "The tallest building in the United States is One World Trade Center." A match need not be an exact match, e.g., keywords or expanded keywords may be used to determine whether an incomplete sentence matches part of a complete sentence. In some implementations, only a portion of the incomplete sentence, such as the entity text, is provided as input to the entity identification model for matching.

A prediction that the entity text included in the incomplete sentence refers to the predicted entity is received from the entity identification model (356). For example, the entity, One World Trade Center, may be provided by the entity identification model. In some implementations, the entity may be provided with a confidence score indicating a measure of confidence that the entity identification model has that the prediction is correct. The identified entity may be used for a number of purposes, such as providing a suggested completion for the incomplete sentence or another portion of a document, or providing corrections for incorrect entities or facts included in the document.

Figure 4:
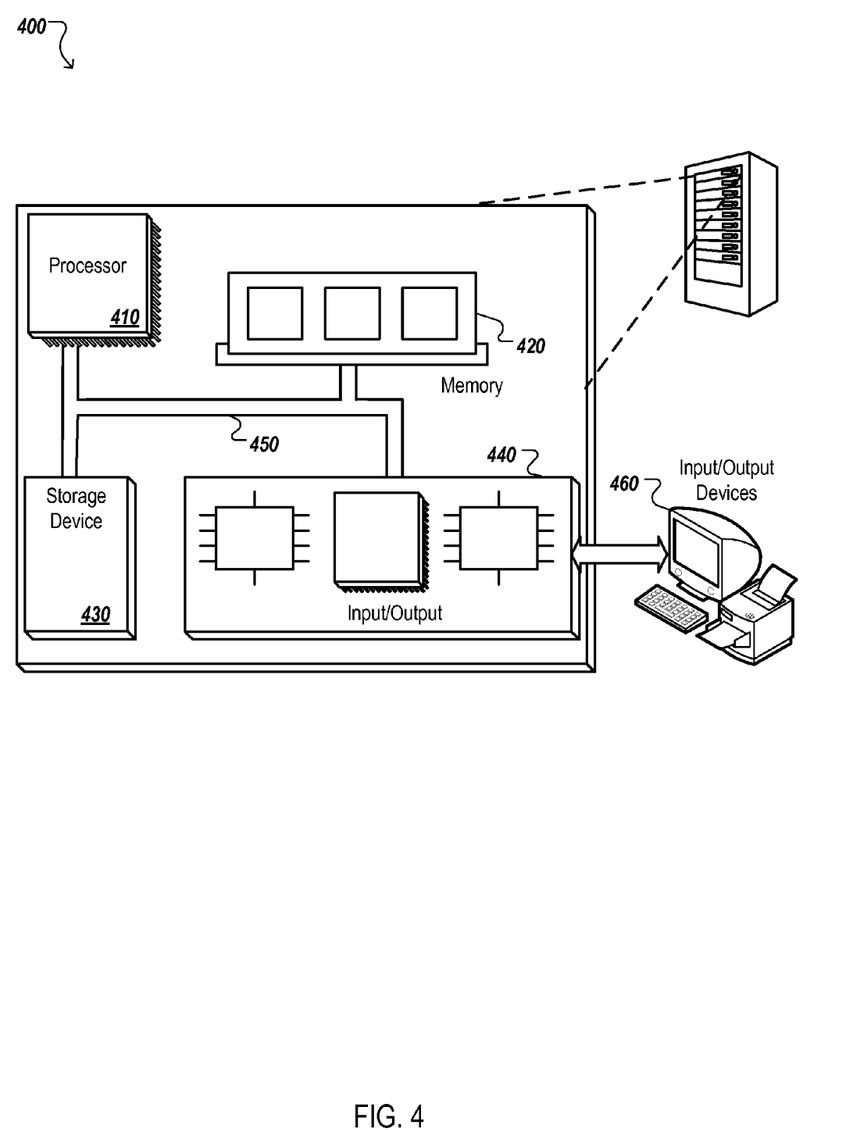
FIG. 4 is a block diagram of an example data processing apparatus.

FIG. 4 is a block diagram of an example data processing apparatus 400. The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more data processing apparatus; and
   a data storage device storing instructions that, when executed by the one or more data processing apparatus, cause the one or more data processing apparatus to perform operations comprising:
      obtaining a plurality of complete sentences that each include entity text that references a first entity;
      for each complete sentence in the plurality of complete sentences:
         providing a first portion of the complete sentence as input to an entity identification model that determines a predicted entity for the first portion of the complete sentence, the first portion being less than all of the complete sentence;
         comparing the predicted entity to the first entity; and
         updating the entity identification model based on the comparison of the predicted entity to the first entity.

2. The system of claim 1, wherein the operations further comprise:
   for each sentence for which the predicted entity does not match the first entity:
      providing a second portion of the complete sentence as input to the entity identification model that determines a second predicted entity for the second portion of the complete sentence, the second portion being different from the first portion and being less than all of the complete sentence;
      comparing the second predicted entity to the first entity; and
      updating the entity identification model based on the comparison of the second predicted entity to the first entity.

3. The system of claim 2, wherein updating the entity identification model based on the comparison of the predicted entity to the first entity comprises reducing a prediction confidence score for the predicted entity when the first portion of the complete sentence is provided as input to the entity identification model.

4. The system of claim 2, wherein updating the entity identification model based on the comparison of the second predicted entity to the first entity comprises increasing a prediction confidence score for the second predicted entity when the second portion of the complete sentence is provided as input to the entity identification model.

5. The system of claim 1, wherein the operations further comprise:
   determining, for each of the plurality of complete sentences, that the entity text included in the complete sentence references the first entity based on the inclusion of the first entity in the complete sentence.

6. The system of claim 1, wherein the first portion of the complete sentence includes a portion of the entity text.

7. The system of claim 6, wherein the entity identification model determines one or more predicted entities for the portion of the entity text included in the first portion of the complete sentence and, for each of the one or more predicted entities, a prediction confidence score that indicates a likelihood that the predicted entity matches the first entity.

* * * * *